(12) United States Patent
Yasuda et al.

(10) Patent No.: US 7,415,957 B2
(45) Date of Patent: Aug. 26, 2008

(54) VEHICULAR INTAKE SYSTEM

(75) Inventors: Kazuhiro Yasuda, Saitama (JP); Shinji Kawatani, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/510,675

(22) Filed: Aug. 28, 2006

(65) Prior Publication Data
US 2007/0044748 A1    Mar. 1, 2007

(30) Foreign Application Priority Data
Aug. 31, 2005    (JP)    ............... 2005-252386

(51) Int. Cl.
    *F02M 35/10*    (2006.01)
    *F02M 35/12*    (2006.01)
    *F02M 35/16*    (2006.01)

(52) U.S. Cl. ............... 123/184.57; 123/184.53

(58) Field of Classification Search ............ 123/184.57, 123/184.21, 184.53
See application file for complete search history.

(56) References Cited

U.S. PATENT DOCUMENTS

| | | | | |
|---|---|---|---|---|
| 4,539,947 A | * | 9/1985 | Sawada et al. | ......... 123/184.57 |
| 5,116,231 A | * | 5/1992 | Oki et al. | ............... 123/184.57 |
| 6,804,360 B1 | * | 10/2004 | Misawa et al. | ............. 381/71.5 |
| 2004/0134460 A1 | * | 7/2004 | Kino et al. | ............... 123/198 E |
| 2004/0187828 A1 | * | 9/2004 | Yasuda et al. | .......... 123/184.57 |
| 2005/0011699 A1 | * | 1/2005 | Horiko | ....................... 181/250 |

FOREIGN PATENT DOCUMENTS

| | | | |
|---|---|---|---|
| JP | 04-306185 A | * | 10/1992 |
| JP | 2003-293873 A | * | 10/2003 |
| JP | 2004-270559 A | | 9/2004 |

* cited by examiner

*Primary Examiner*—Stephen K. Cronin
*Assistant Examiner*—Ka Chun Leung
(74) *Attorney, Agent, or Firm*—Birch, Stewart, Kolasch & Birch, LLP

(57) ABSTRACT

A vehicular air intake system including a resonator for eliminate the possibility of dust and water droplets collecting in the resonator. An end portion of an air intake duct is branched into a resonator and an air intake section. In the air intake section, a chamber is formed having an air intake port for taking in outside air. The resonator is disposed upwardly of the air intake port. A branch pipe section and the chamber are positioned such that they are slightly inclined downwardly toward a main pipe section. In this arrangement, the air intake duct is disposed downwardly of a seat and a resin cover such that the air intake port is located a required distance away from a rear external surface of a fuel tank.

18 Claims, 5 Drawing Sheets

VEHICULAR INTAKE SYSTEM

CROSS-REFERENCE TO RELATED APPLICATIONS

The present application claims priority under 35 USC 119 to Japanese Patent Application No. 2005-252386 filed on Aug. 31, 2005 the entire contents of which are hereby incorporated by reference.

FIELD OF THE INVENTION

The present invention relates to a vehicular intake system.

DESCRIPTION OF BACKGROUND ART

A vehicular air intake system is known wherein an air intake duct (air intake pipe) is provided with a resonator (expansion chamber) for reducing air intake noise.

The air intake pipe used in the vehicular air intake system has an air intake port provided at a highest portion thereof and a resonator provided in a portion thereof between the air intake port and an air cleaner. See, for example, JP-A No. 270559/2004, FIG. 3 on page 4.

The above vehicular air intake system is extremely suitable for reducing air intake noise. However, this system has caused the following problem that requires a solution.

More specifically, with the air intake pipe used in the conventional vehicular air intake system having an air intake port provided at its highest portion and a resonator provided at a portion between the air intake port and an air cleaner, dust and water droplets possibly collect in the resonator.

The resonator used in the conventional vehicular air intake system is detachable. Therefore, if dust and water droplets collect in the resonator, the resonator can be removed and cleaned. However, removing and cleaning the resonator every time dust and water droplets collect therein is bothersome.

SUMMARY AND OBJECTS OF THE INVENTION

The present invention has been made in view of the above situation, and it is an object of an embodiment of the present invention to provide a vehicular air intake system which can solve the above problem.

To solve the above technical problem, a vehicular air intake system according to the present invention incorporates the following technical means.

According to an embodiment of the present invention, an air intake duct is connected with an air cleaner for taking in outside air and includes a base part of the air intake duct that is connected with the air cleaner. The air intake duct includes a branching section upstream of the air cleaner with a branched portion upstream of the branching section being formed as a resonator section and another branched portion upstream of the branching section being formed as an air intake section having an air intake port. The resonator section is disposed upward of the branching section.

According to an embodiment of the present invention, the vehicular air intake system includes the air intake section that is provided with a chamber wherein the chamber is provided with the air intake port such that the air intake port is located upwardly of a bottom surface of the chamber.

According to an embodiment of the present invention, the air intake port has an opening area larger than an opening area of the branching section providing branching to the air intake section.

According to an embodiment of the present invention, at least the air intake section, the resonator section and the branching section are integrally formed.

According to an embodiment of the present invention, the air intake duct is disposed, in a vehicle having a container and a seat disposed adjacent to each other, downwardly of the seat such that the air intake port is located at a required distance away from a surface of the container.

According to an embodiment of the present invention, a bottom surface of the air intake section is inclined downward toward the branching section providing branching to the air intake portion, the bottom surface being in communication with the opening of the branching section.

According to an embodiment of the present invention, an end portion of an air intake duct is branched into a resonator and an air intake section with the air intake section being provided with an air intake port for taking in outside air. A resonator is disposed upwardly of the air intake port. With this arrangement, it is possible to prevent dust and water droplets from collecting in the resonator and simplify the configuration of the air intake duct.

According to an embodiment of the present invention, isolating dust and water droplets, which enter through the air intake port, in a chamber is facilitated.

According to an embodiment of the present invention, the air intake port has an opening area larger than the opening area of a branching section providing branching to the air intake section. This reduces noise and enables the air in the chamber to be used as a buffer.

According to an embodiment of the present invention, individual component sections are integrally formed together, realizing a simple overall configuration and enabling cost reduction.

According to an embodiment of the present invention, the air intake duct is disposed in a defined position, so that dust infiltration can be prevented.

According to an embodiment of the present invention, by sending dust having entered the air intake section into an air cleaner (case), the dust can be prevented from collecting in the air intake section.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Next, an embodiment of a vehicular air intake system according to the present invention will be described with reference to the accompanying drawings. The vehicular air intake system of the present embodiment is described as an example apparatus applied to a so-called saddle-ride type four-wheeled buggy A. A detailed description of the parts, other than the vehicular air intake system constituting an essential part, of the four-wheeled buggy will be omitted in the following. In the accompanying drawings, a four-wheeled buggy A includes a vehicular air intake system 9.

Figure 1:
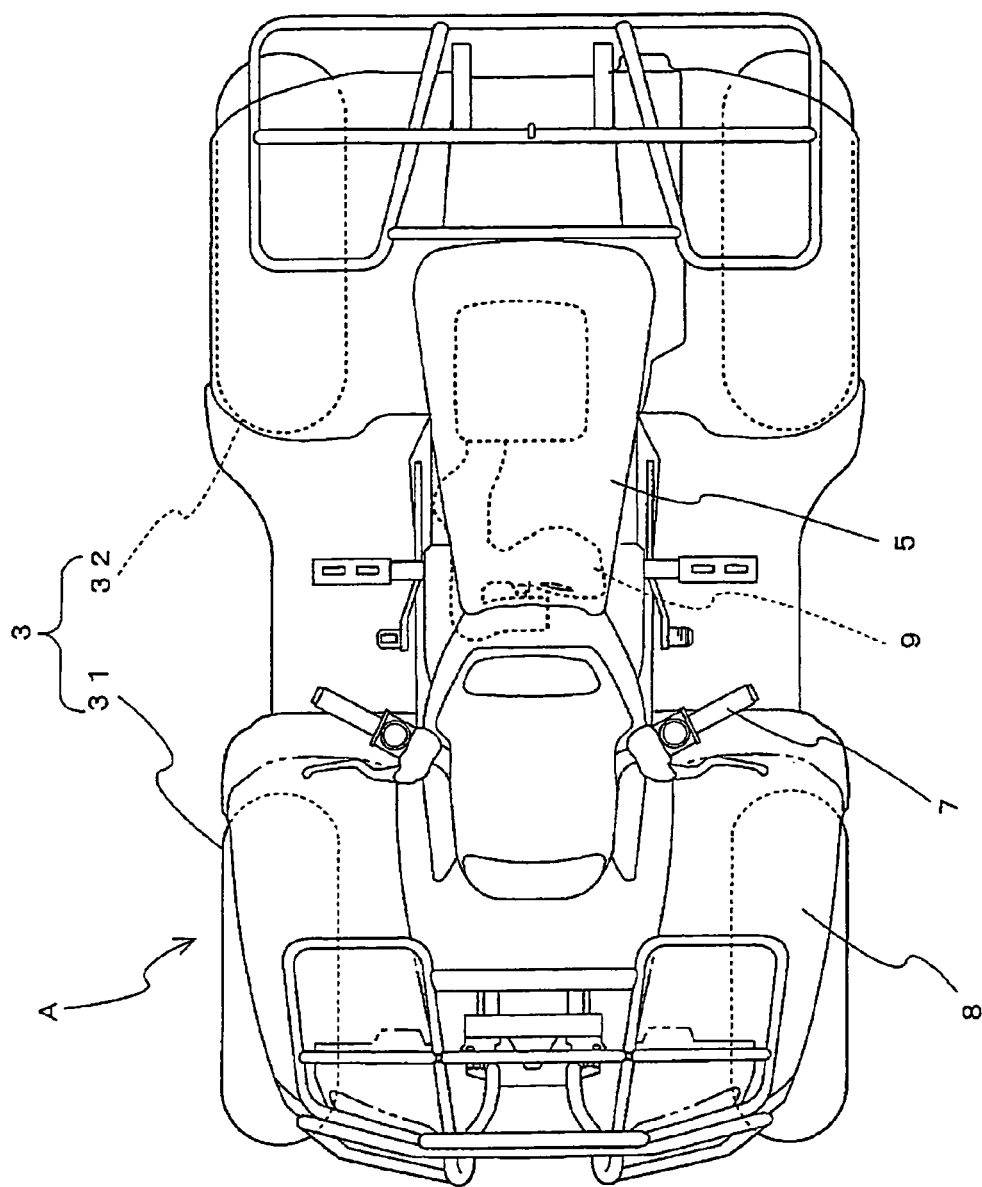
FIG. 1 is a plan view of a four-wheeled buggy using a vehicular air intake system according to the present embodiment.
Figure 2:
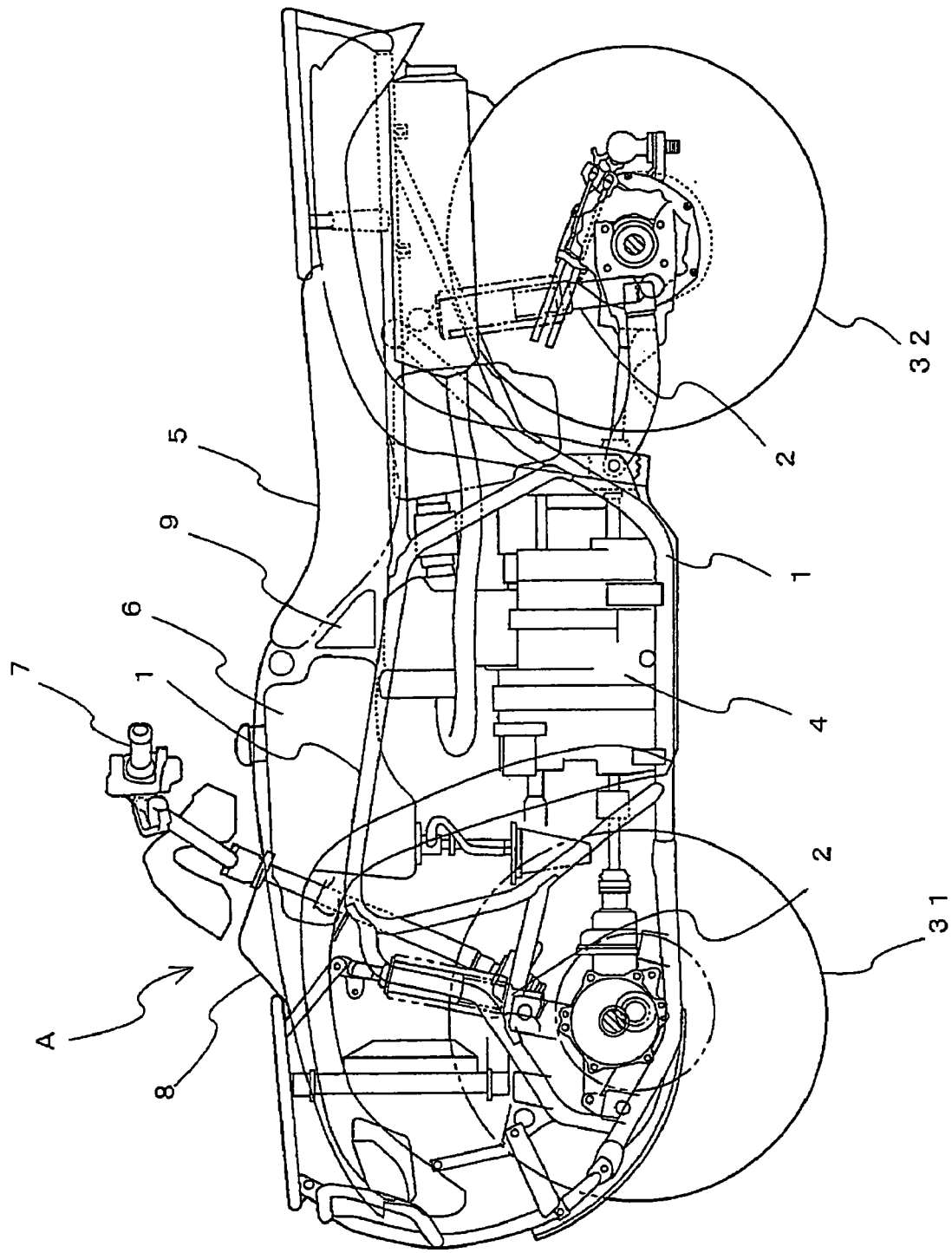
FIG. 2 is a side view of the four-wheeled buggy.

The four-wheeled buggy A using the vehicular air intake system according to the present embodiment includes, as shown in FIGS. 1 and 2, a body frame 1 making up a framework of the four-wheeled buggy A. Suspension systems 2 are provided each with a base part connected to the body frame 1. A wheel section 3 includes one pair each of front wheels 31 and rear wheels 32 with each pair being supported by the corresponding suspension system 2 and the body frame 1. An engine section 4 includes an internal speed reduction mechanism (not illustrated) connected, via a transmission mechanism, to the rear wheels 32. A seat 5 is provided on which a driver can sit astride a fuel tank 6 disposed adjacent to a front part of the seat 5. Handlebars 7 are supported by the body frame 1 and are connected to the front wheels 31 via a transmission mechanism. A resin cover 8 covers such parts as the transmission systems 2, the wheel section 3 and the fuel tank 6 and the vehicular air intake system 9 disposed downwardly of the seat 5. The four-wheeled buggy A is configured to be self-propelled according to the operation of the handlebar, the throttle and the gears operation by the driver sitting astride the seat 5.

Next, the vehicular air intake system 9 constituting an essential part of the present invention will be described in detail.

The vehicular air intake system 9 has an air cleaner 901 and an air intake duct 9.

Figure 3:
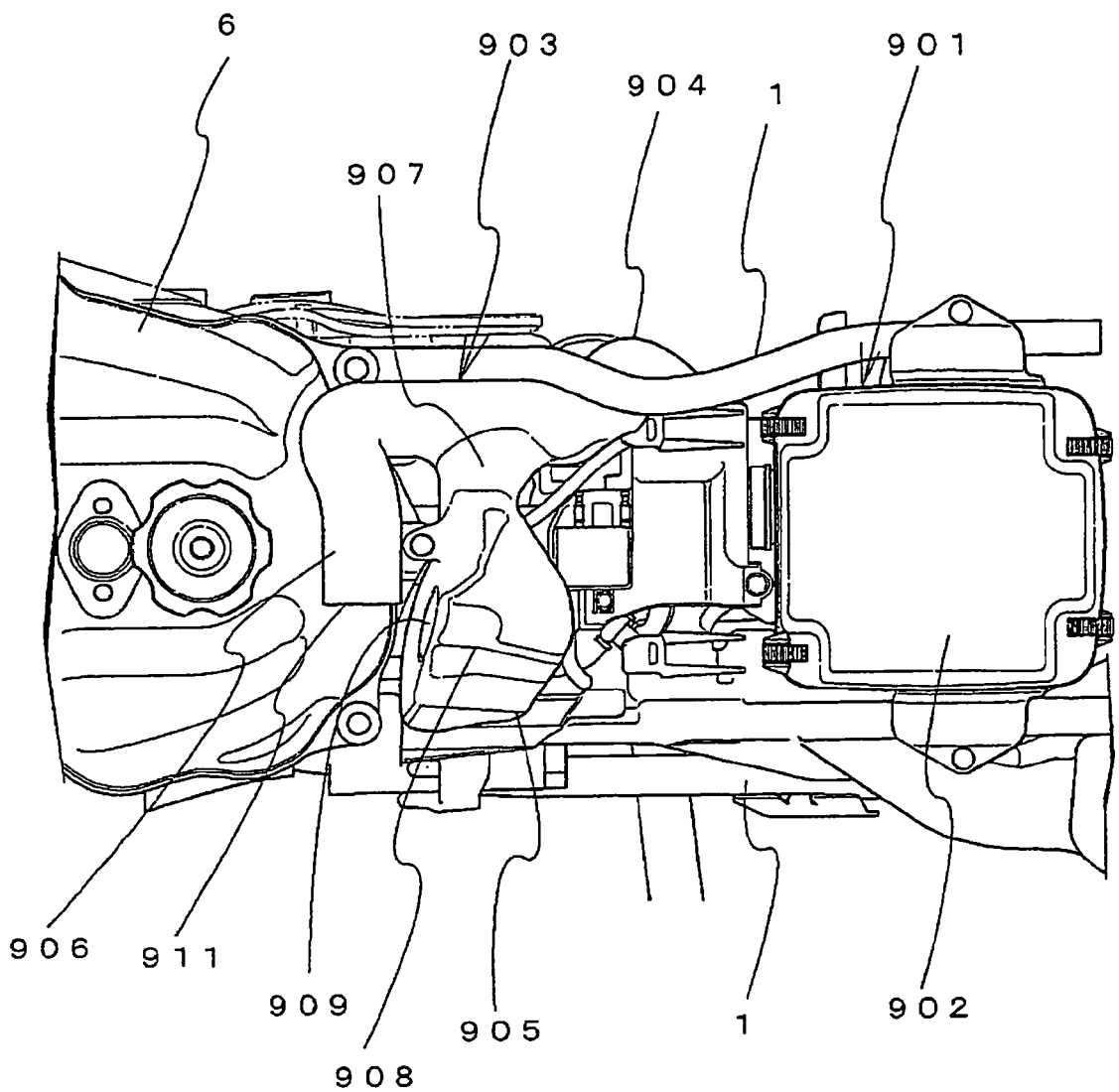
FIG. 3 is an enlarged, partially broken away plan view of the four-wheeled buggy.
Figure 4:
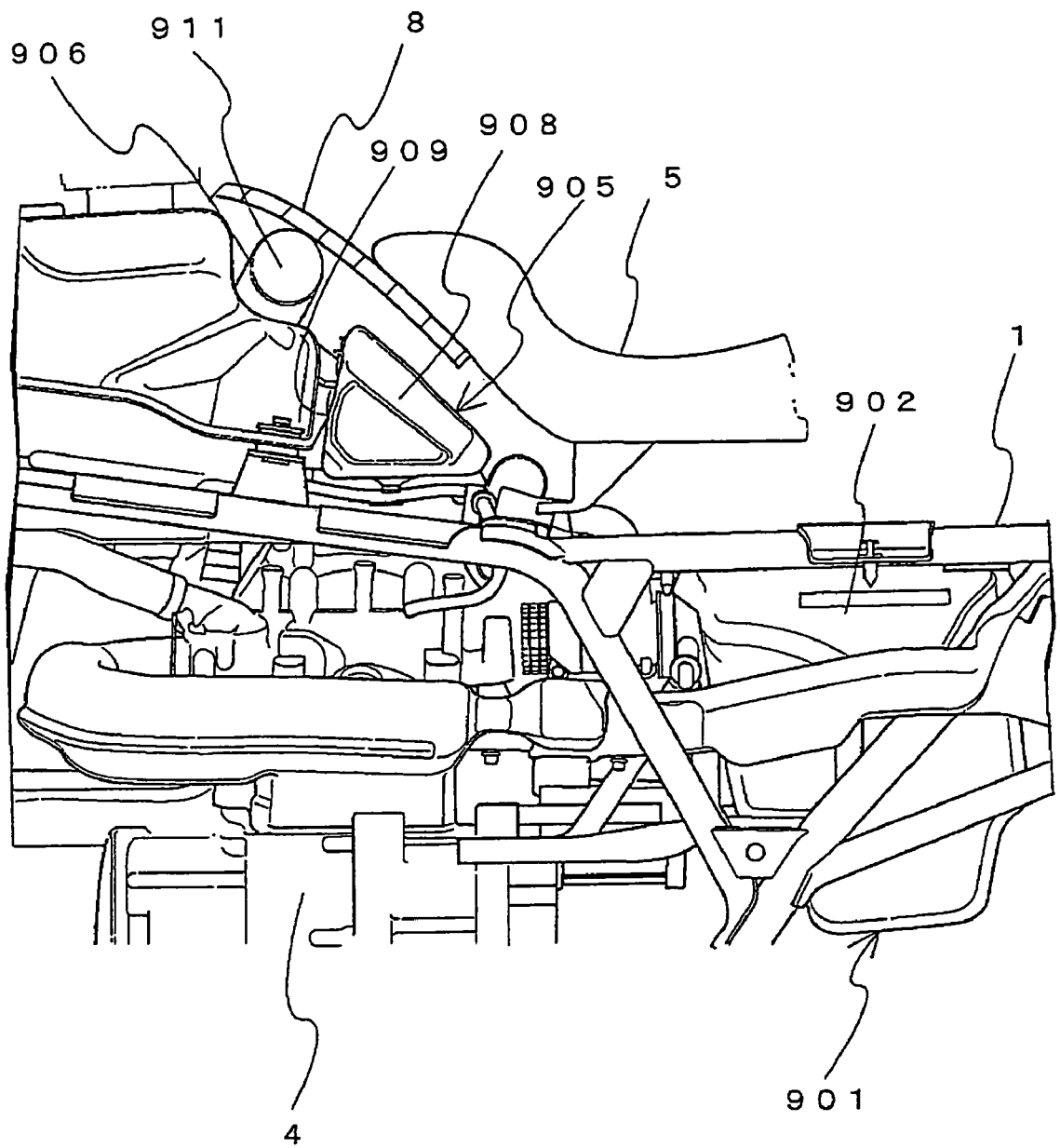
FIG. 4 is an enlarged, partially broken away side view (transparent view) of the four-wheeled buggy.

The air cleaner 901 includes, as shown in FIGS. 3 and 4, an air cleaner case 902 drooping inside the body frame 1 and a filter element (not illustrated) which is housed in the air cleaner case 902 and which cleans the air taken in from outside.

On the upstream side of the air cleaner 901, a base part of an air intake duct 903, being described later, is connected to the air cleaner 901 with the filter element being disposed between the air cleaner 901 and the air intake duct 903. On the downstream side, the suction side (air intake manifold) of the engine section 4 is connected to the air cleaner 901 via a throttle valve.

Figure 5:
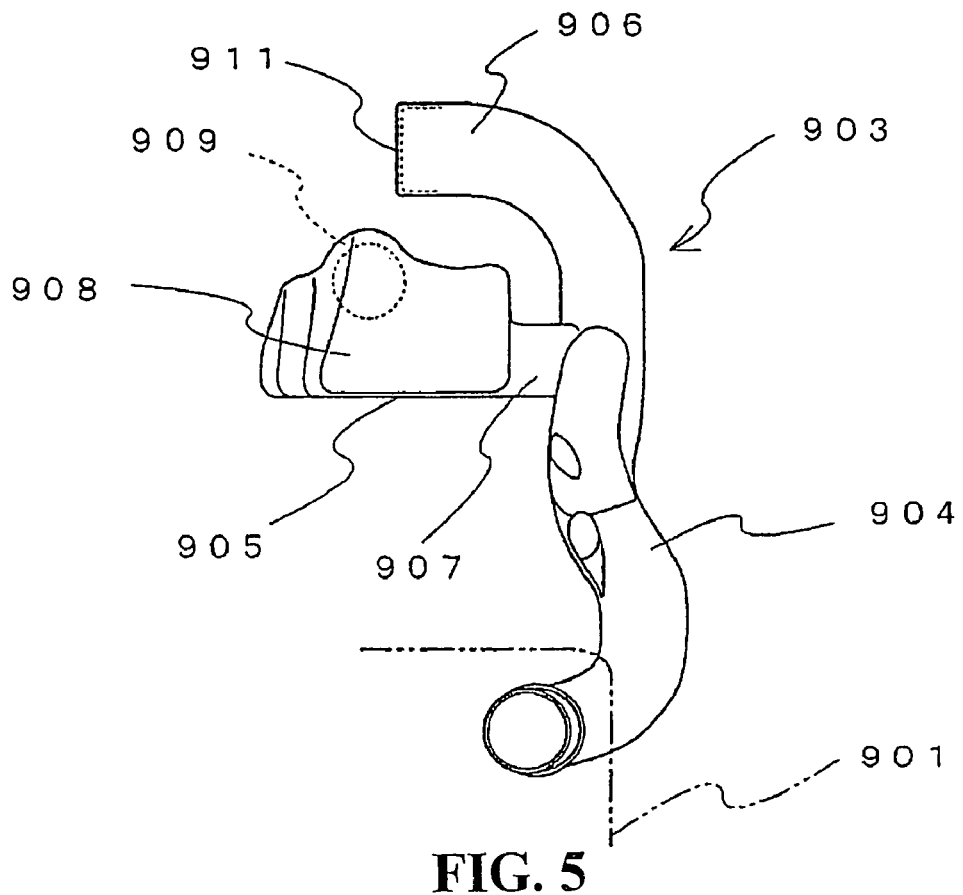
FIG. 5 is a rear view of an air intake duct.

The air intake duct 903 includes, as shown in FIG. 5, a tubular main pipe section 904 includes a base part connected to the upstream side of the air cleaner 901, a hollow air intake section 905 in communication with an end portion of the main pipe section 904 extending upwardly and which extends approximately horizontally and a resonator 906 which is in communication with the end portion of the main pipe section 904 and which is curved to be formed in the direction in which the air intake section 905 extends. The air intake section 905, the resonator 906 and the main pipe section 904 are integrally welded together.

Figure 6:
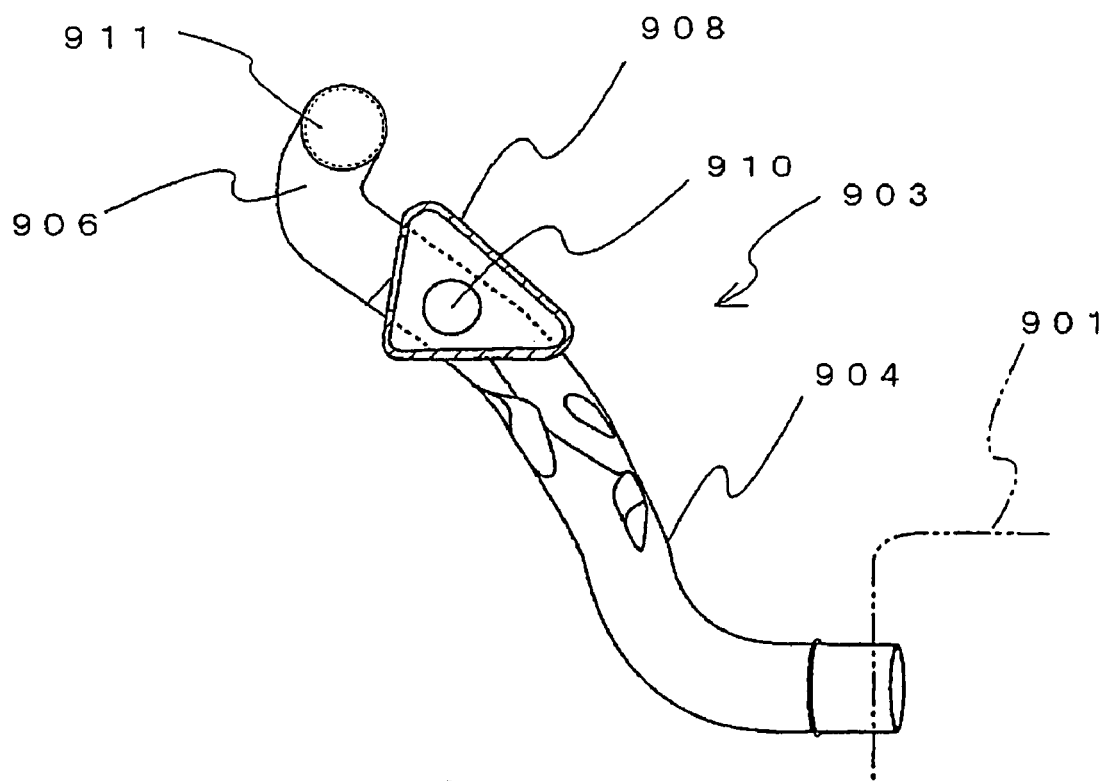
FIG. 6 is a partially broken away side view of the air intake duct.

As shown in FIG. 6, in the air intake duct 903, the main pipe section 904 excluding the base part thereof and a base part, which is in communication with the end portion of the main pipe section 904, of the resonator 906 are inclined so that the air intake section 905 and the resonator 906 are disposed more toward a front of the vehicle than the approximately horizontally extending base part of the main pipe section 904.

The air intake section 905 includes a branch pipe section 907 which is in communication with the end portion of the main pipe section 904 and which is smaller in diameter than the main pipe section 904 and a chamber 908 provided at an end of the branch pipe section 907.

The chamber 908 has an approximately triangular pillar shape. It is hollow having a required volume and in communication with the branch pipe section 907. As shown in FIG. 6, the chamber 908 is connected to the branch pipe section 907 while being positioned such that a side of the chamber 908 is aligned with the inclination of the main pipe section 904 and such that the other two sides of the chamber 908 are approximately vertical (with a top portion slightly inclined toward a rear of the vehicle) and approximately horizontal, respectively.

The approximately vertical side of the chamber 908 is provided with an air intake port 909 (disposed upward of a bottom of the chamber 908) for taking in air from the outside. The air intake port 909 has an opening area which is larger than the area of a portion where the main pipe section 904 and the branch pipe section 907 are connected, that is, the area of an opening 910 of a branching section providing branching to the air intake section 905. This enhances the air intake efficiency of the air intake section 905.

The branch pipe section 907 and the chamber 908 are connected such that the inside bottom surface of the branch pipe section 907 and the bottom surface of the chamber 908 are aligned in a same plane. Furthermore, the branch pipe section 907 and the chamber 908 are positioned such that they are slightly inclined downwardly toward the main pipe section 904. With this configuration, dust and water droplets are prevented from collecting at the bottom of the chamber 908 or inside the branch pipe section 907.

The resonator 906 has a tubular shape having the same diameter as the main pipe section 904. As described above, the resonator 906 has a base part connected with the end portion of the main pipe section 904 and inclined along the inclination of the main pipe section 904 and an end portion curved to be formed in the direction in which the air intake section 905 extends. The resonator 906 is provided in a higher position than the air intake port 909.

An end face 911 of the resonator 906 is blocked forming a space of a required volume. The space is designed to reduce air intake noise.

The air intake duct 903 configured as described above is disposed, as shown in FIGS. 3 and 4, downwardly of the seat 5 and the resin cover 8 such that the approximately horizontally extending end portion of the resonator 906 is disposed at a rear of the recessed fuel tank 6, and such that the air intake port 909 is located a required distance away from an outer rear surface of the fuel tank 6 (container).

The vehicular air intake system 9 configured as described above sucks air in through the air intake port 909 of the chamber 908, and filters the air thus sucked in with the filter element in the air cleaner 901. The clean air thus filtered flows into engine cylinders via the throttle valve for air flow adjustment and the air intake manifold. As fuel is injected into the cylinders under the control of a throttle lever provided at the handlebar 7, it is ignited causing the engine to be driven continually. At this time, the resonator 906 reduces air intake noise.

As described above, in the vehicular air intake system 9 according to the present embodiment, the resonator 906 is disposed upwardly of the air intake port 909, so that dust and water droplets are prevented from collecting in the resonator 906.

The chamber 908 is provided with the air intake port 909 located upward of the bottom surface of the chamber 908. This facilitates isolating dust and water droplets, which enter through the air intake port 909, in the chamber 908.

The air intake port 909 has an opening area larger than the opening area of the branching section providing branching to the air intake section 905. This reduces noise and allows the air in the chamber 908 to be used as a buffer.

Individual component sections are integrally formed together, simplifying the overall configuration and enabling a reduction in cost.

The air intake port 909 is located a required distance away from the outer rear surface of the fuel tank 6 (container) while being disposed downwardly of the seat 5 and the resin cover 8, so that dust and water droplets cannot easily enter the chamber 908.

The branch pipe section 907 and the chamber 908 are slightly inclined downwardly toward the main pipe section 904. Therefore, even if dust and water droplets enter the chamber 908, they are prevent from collecting at the bottom of the chamber 908 or inside the branch pipe section 907.

The vehicular air intake system according to the present embodiment has been described, but the embodiment is only an example of a preferred embodiment of the present invention. The present invention is not limited to the embodiment, and can be changed and modified in various ways within the scope not departing from the spirit of the invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicular air intake system comprising:
   a resonator;
   an air intake section including a chamber with an air intake port being operatively connected to the chamber at a predetermined position and
   a branching section of an air intake duct being inclined downwardly and said air intake duct being disposed upstream of an air cleaner;
   wherein said resonator is disposed upwardly of the air intake port wherein the chamber is formed substantially as a triangular pillar.

2. The vehicular air intake system according to claim 1, wherein the resonator section includes an end face facing toward a vehicle side.

3. A vehicular air intake system comprising:
   an air intake duct connected with an air cleaner for taking in outside air, the air intake duct including:
      a main pipe section and an air intake section with an air intake port;
      a base part of the air intake duct being connected with the air cleaner;
      a branching section of the air intake duct being disposed upstream of the air cleaner;
      an intake section extending approximately horizontally with respect to the branching section, and
      a resonator section having a tubular shape with the same diameter as the main pipe section,
      wherein the resonator section extends upwardly and forwardly from the branching section, is curved in a direction toward the air intake section, is disposed upwardly forwardly of the air intake port of the branching section.

4. The vehicular air intake system according to claim 3, wherein the air intake section is provided with a chamber and the chamber is provided with the air intake port such that the air intake port is located upwardly of a bottom surface of the chamber.

5. The vehicular air intake system according to claim 4, wherein the air intake port has an opening having an area that is larger than an area of an opening of the branching section providing branching to the air intake section.

6. The vehicular air intake system according to claim 5, wherein at least the air intake section, the resonator section and the branching section are integrally formed.

7. The vehicular air intake system according to claim 4, wherein at least the air intake section, the resonator section and the branching section are integrally formed.

8. The vehicular air intake system according to claim 4, wherein the air intake duct is disposed, in a vehicle having a container and a seat disposed adjacent to each other, downwardly of the seat such that the air intake port is located a predetermined distance away from a surface of the container.

9. The vehicular air intake system according to claim 4, wherein a bottom surface of the air intake section is inclined downwardly toward the branching section providing branching to the air intake section, the bottom surface being in communication with an opening of the branching section.

10. The vehicular air intake system according to claim 1, wherein the air intake port has an opening having an area that is larger than an area of an opening of the branching section providing branching to the air intake section.

11. The vehicular air intake system according to claim 10, wherein at least the air intake section, the resonator section and the branching section are integrally formed.

12. The vehicular air intake system according to claim 1, wherein at least the air intake section, the resonator section and the branching section are integrally formed.

13. The vehicular air intake system according to claim 3, wherein the air intake duct is disposed, in a vehicle having a container and a seat disposed adjacent to each other, downwardly of the seat such that the air intake port is located a predetermined distance away from a surface of the container.

14. The vehicular air intake system according to claim 3, wherein the air intake port includes an opening that faces toward a vehicle front and away from the air cleaner.

15. The vehicular air intake system according to claim 3, wherein the resonator section includes an end face facing toward a vehicle side.

16. The vehicular air intake system according to claim 3, wherein a bottom surface of the air intake section is inclined downwardly toward the branching section providing branching to the air intake section, the bottom surface being in communication with an opening of the branching section.

17. The vehicular air intake system according to claim 3, wherein the air intake section is provided with a chamber and the chamber is provided with the air intake port such that the air intake port is located upwardly of a bottom surface of the chamber,
   wherein the chamber is located rearwardly of the resonator and forwardly of the air cleaner.

18. The vehicular air intake system according to claim 3, wherein the air intake section is provided with a chamber and the chamber is provided with the air intake port such that the air intake port is located upwardly of a bottom surface of the chamber,
   and when viewed in side view, the chamber has a cross section that is substantially triangular in shape.

* * * * *